S. A. DOBYNE.
HORN FOR FASTENER INSERTING MACHINES.
APPLICATION FILED JUNE 11, 1917.
1,296,582.
Patented Mar. 4, 1919.
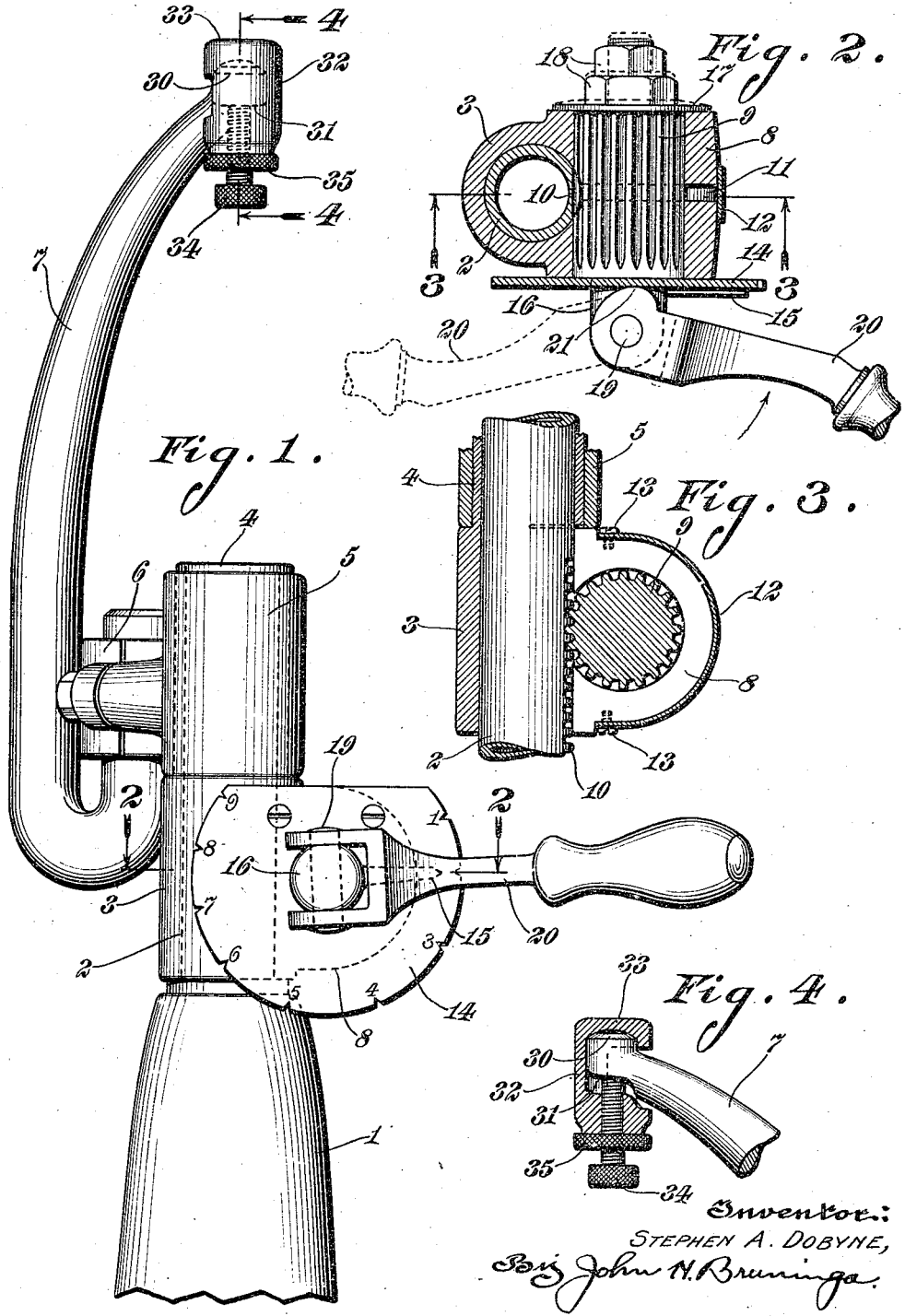

UNITED STATES PATENT OFFICE.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

HORN FOR FASTENER-INSERTING MACHINES.

1,296,582.  Specification of Letters Patent.  Patented Mar. 4, 1919.

Application filed June 11, 1917. Serial No. 174,097.

*To all whom it may concern:*

Be it known that I, STEPHEN A. DOBYNE, a citizen of the United States, and residing at St. Louis, Missouri, have invented the new and useful Improvement in Horns for Fastener-Inserting Machines, of which the following is a specification.

This invention relates to horns or work supports, adapted more particularly to fastener inserting machines.

In the use of fastener inserting machines, the thickness of the work often varies considerably, for instance, when using the machine on soles and heels, as well as on different heights of heels. In such machines, some form of manual adjustment is necessary.

One of the objects of this invention, therefore, is to provide means for manually adjusting the height of the horn, which will be simple in construction and operation, and by which the horn can be quickly adjusted and quickly locked in adjusted position.

In the use of fastener inserting machines, more particularly for repair work, it is often necessary to use the same machine for sole attaching and for slugging. For sole attaching, a cupped anvil is required in order to clench the fastener passing through the sole; for slugging, however, the anvil should be smooth, so as to furnish a smooth even bearing surface for the heel part of the shoe.

Another object of this invention, therefore, is to provide a horn with both clenching and slugging anvils, so constructed as to permit quick change from clenching to a slugging anvil and vice versa.

Further objects will appear from the detail description taken in connection with the accompanying drawings, in which, Figure 1 is a side elevation of the upper part of a horn embodying this invention;

Fig. 2 is a section on the line 2—2, Fig. 1;

Fig. 3 is a section on the line 3—3, Fig. 2; and,

Fig. 4 is a section on the line 4—4, Fig. 1.

Referring to the accompanying drawing, 1 designates a part of the machine column which forms a bearing for the horn spindle 2. Mounted to slide on this spindle is a sleeve 3, which is reduced in diameter, as shown at 4, to provide a bearing for a sleeve 5, which is in turn provided with a bracket 6 having clamped therein, the horn 7. The sleeve 3 is provided with a bearing 8 for a rotatable toothed actuator 9, gearing with a rack 10 on the horn spindle. The bearing 8 is split, as shown at 11, so as to permit contraction of this bearing on the horn spindle to clamp the sleeve 3 thereon, as hereinafter described. A cover 12, attached at its ends by means of screws 13 to the bearing, is arranged to cover the slot 11. Secured to the bearing 8 is a dial 14, with which coöperates a pointer 15 on the shaft 16 of the toothed actuator 9. The other end of the actuator shaft has mounted thereon, a spring washer 17 held in place by nuts 18. Pivoted at 19, on the end of the actuator shaft, is a combined adjusting and locking member 20. This member 20 embraces the ends of the shaft 16, and is provided with cam faces 21, adapted to engage the dial plate 14.

When the actuating and locking member 20 is in dotted position, Fig. 2, the bearing 8 is released, and by rotating the member, and with it the actuator, the horn may be adjusted vertically on its spindle to any desired adjusted position, as indicated by the position of the pointer 15, with respect to the graduations on the dial plate. When the horn has been adjusted to the desired position, the member 20 is moved beyond full-line position, Figs. 2 and 1, against the dial plate, and the cams 21 will now coöperate with the dial plate 14, so as to contract the bearing 8, flatten the spring washer 17, and thus firmly lock the actuator with the horn in adjusted position. It will thus be seen that there is provided a simple and effective locking means, by means of which the horn can be quickly adjusted and locked in adjusted position.

Referring now to Figs. 1 and 4, it will be seen that the horn tip is provided with the usual clenching anvil 30, which is, of course, cupped to provide a suitable clenching surface for the fasteners driven through the sole. The horn tip is shouldered, as shown at 31. Adapted to be slipped over the horn tip is a slugging tip 32, formed to provide a smooth flat surface 33, adapted to engage the inside of a shoe sole at the heel, when slugging. Threaded into this tip is a screw 34 provided with a knurled head and adapted to engage the shoulder 31 on the horn to securely clamp the slugging tip in position. A knurled lock nut 35 is provided for securely locking the slugging tip in position.

When the machine is to be used for attaching soles to shoes where a clenching anvil is necessary, the slugging tip is removed, thus exposing the clenching anvil. When, however, the machine is to be used for slugging, the slugging tip is placed over the horn tip and locked in position, and the horn is then provided with a smooth slugging anvil, well adapted for slugging purposes, and preventing marring of the inside of the sole.

It is obvious that various changes may be made in the details of construction, within the scope of the claims, without departing from the spirit of this invention. It is, therefore, to be understood that this invention is not to be limited to the specific construction shown and described.

Having thus described the invention, what is claimed is:

1. In a machine of the class described, a horn spindle, a horn mounted for vertical adjusting movement thereon, means for adjusting said horn on said spindle and for locking said horn in adjusted position, and a controlling member connected to operate said adjusting and locking means, adapted upon adjusting movement to adjust said horn, and adapted upon locking movement to lock said horn, while maintaining the final adjustment of the horn unaltered.

2. In a machine of the class described, a horn spindle, a horn mounted for vertical adjusting movement thereon, means for adjusting said horn on said spindle, means for locking said horn in adjusted position, and a member for operating said adjusting and said locking means, adapted to release said locking means and then adjust said horn, and adapted to engage said locking means to lock the horn when finally adjusted.

3. In a machine of the class described, a horn spindle, a horn mounted for vertical adjusting movement thereon, means for adjusting said horn on said spindle, means for locking said horn in adjusted position, and a member movable to one position to operate said adjusting means and movable to another position to operate said locking means.

4. In a machine of the class described, a horn spindle, a horn mounted for vertical adjusting movement thereon, means for adjusting said horn on said spindle, means for locking said horn in adjusted position, and a member movable in one direction to operate said adjusting means and movable in another direction to operate said locking means.

5. In a machine of the class described, a horn spindle, a horn mounted for vertical adjusting movement thereon, an actuator adapted to adjust said horn on said spindle, means for locking said actuator in adjusted position, and a member adapted upon movement in one direction to operate said actuator and adapted upon movement in another direction to lock said locking means.

6. In a machine of the class described, a horn spindle, a horn mounted for vertical adjusting movement thereon, an actuator adapted to adjust said horn on said spindle, means for locking said actuator in adjusted position, and a member mounted for movement on and with said actuator and adapted to move on said actuator to operate said locking means to lock said actuator.

7. In a machine of the class described, a horn spindle, a horn mounted for vertical adjusting movement thereon, an actuator adapted to adjust said horn on said spindle, means for locking said actuator in adjusted position, and a member pivoted on said actuator and adapted to move said actuator to adjust said horn and adapted to swing on said actuator to operate said locking means to lock said actuator.

8. In a machine of the class described, a horn spindle, a horn mounted for vertical adjusting movement thereon, a bearing on said spindle, an actuator mounted for rotation in said bearing and adapted to adjust said horn in said spindle, and a member mounted on said actuator, adapted to rotate said actuator to adjust said horn and adapted to move on said actuator to lock the same.

9. In a machine of the class described, a horn spindle, a horn mounted for vertical adjusting movement thereon, a bearing on said spindle, an actuator mounted for rotation in said bearing and adapted to adjust said horn in said spindle, and a member pivoted on said actuator, adapted to rotate said actuator to adjust said horn and adapted to swing on said actuator to lock the same in its bearing.

10. In a machine of the class described, a horn having a curved end, a horn tip removably mounted on and embracing the curved end, and means for clamping said tip on said horn.

11. In a machine of the class described, a horn, a horn tip adapted to be removably mounted thereon, and means carried by said tip for clamping said tip on said horn.

12. In a machine of the class described, a horn having a clenching anvil, and a slugging anvil adapted to be placed over said clenching anvil.

13. In a machine of the class described, a horn having a clenching anvil, a slugging anvil adapted to be placed over said clenching anvil, and means for clamping said slugging anvil in position.

In testimony whereof I affix my signature this 12th day of April, 1917.

STEPHEN A. DOBYNE.

Copies of this patent may be obtained for five cents each, by addressing the "Commissioner of Patents, Washington, D. C."